US009731555B2

(12) United States Patent
Tanaka et al.

(10) Patent No.: US 9,731,555 B2
(45) Date of Patent: Aug. 15, 2017

(54) PNEUMATIC TIRE

(71) Applicant: SUMITOMO RUBBER INDUSTRIES, LTD., Kobe-shi, Hyogo (JP)

(72) Inventors: Kouichirou Tanaka, Kobe (JP); Satoshi Iwasaki, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 566 days.

(21) Appl. No.: 14/176,765

(22) Filed: Feb. 10, 2014

(65) Prior Publication Data

US 2014/0238563 A1    Aug. 28, 2014

(30) Foreign Application Priority Data

Feb. 27, 2013    (JP) .................................. 2013-037626

(51) Int. Cl.
*B60C 11/04*    (2006.01)
*B60C 7/00*    (2006.01)
*B60C 11/03*    (2006.01)

(52) U.S. Cl.
CPC .............. *B60C 7/00* (2013.01); *B60C 11/033* (2013.04); *B60C 11/0306* (2013.04); *B60C 2011/0346* (2013.04); *B60C 2011/0372* (2013.04); *B60C 2011/0381* (2013.04); *B60C 2011/0383* (2013.04); *B60C 2011/0388* (2013.04)

(58) Field of Classification Search
CPC .............. B60C 2200/14; B60C 11/033; B60C 11/0318; B60C 2011/0381; B60C 2011/0383; B60C 2011/0388; B60C 2011/0346; B60C 2011/0358; B60C 2011/0372; B60C 11/04
USPC .................................. D12/586–589, 551–554
See application file for complete search history.

(56) References Cited

U.S. PATENT DOCUMENTS

| D437,264 | S | * | 2/2001 | Lassan | ......................... D12/589 |
| D647,465 | S | * | 10/2011 | Iwasaki | ....................... D12/586 |
| 2004/0020577 | A1 | | 2/2004 | Hirai | |

(Continued)

FOREIGN PATENT DOCUMENTS

| JP | 2004-58839 A | 2/2004 | |
| JP | 2006176055 A | * | 7/2006 | ............. B60C 11/11 |
| JP | 2012-218652 A | 11/2012 | |

*Primary Examiner* — Michael H Wilson
*Assistant Examiner* — Philip N Schwartz
(74) *Attorney, Agent, or Firm* — Birch, Stewart, Kolasch & Birch, LLP (57) ABSTRACT

A pneumatic tire includes a tread portion provided with a pair of shoulder main grooves and at least one crown main groove between the shoulder main grooves to define a pair of middle portions between the adjacent shoulder main groove and crown main groove. The middle portions are provided with inner middle lug grooves and outer middle lug grooves. Each outer middle lug groove extends from the shoulder main groove to its axially inner end while decreasing its groove width. The outer middle lug groove are arranged with alternately arranged first pitches and second pitches, wherein the second pitches are larger than the first pitches. Each inner middle lug groove extends from the crown main groove to its axially outer end while decreasing its groove width. The inner middle lug grooves are arranged with substantially the same pitches.

16 Claims, 4 Drawing Sheets

(56) References Cited

U.S. PATENT DOCUMENTS

2013/0068360 A1\* 3/2013 Tamugi ............... B60C 11/0306
152/209.18

\* cited by examiner

PNEUMATIC TIRE

BACKGROUND OF THE INVENTION

Field of the Invention

The present invention relates to a pneumatic tire, and in particular, relates to a pneumatic tire used for traveling on mud terrain.

Description of the Related Art

Pneumatic tires for four-wheel drive vehicle tend to have an opportunity for traveling not only on the street, but also on loose mud terrain. Thus, such pneumatic tires are requested to an improved mud terrain performance that offers large traction force on mud terrain.

Conventionally, a pneumatic tire having a tread portion provided with grooves with large groove volume is proposed in order to improve mud terrain performance. However, the pneumatic tire described above tends to generate large noise during traveling on dry asphalt roads due to compressed air in such grooves maximized in groove volume.

SUMMARY OF THE INVENTION

The present invention has been worked out in light of the circumstances described above, and has a main object of providing a pneumatic tire having an improved mud terrain performance while maintaining noise performance on dry roads.

According to one aspect of the present invention, there is provided a pneumatic tire including a tread portion having a pair of tread edges, the tread portion being provided with a pair of circumferentially and continuously extending zigzag shoulder main grooves adjacent to each tread edge and at least one circumferentially and continuously extending zigzag crown main groove disposed between the shoulder main grooves to define a pair of middle portions each of which is between the adjacent shoulder main groove and crown main groove. The respective middle portions are provided with a plurality of inner middle lug grooves and a plurality of outer middle lug grooves. Each outer middle lug groove extends from the shoulder main groove to its axially inner end terminating within the middle portion while decreasing its groove width toward the axially inner end. The outer middle lug grooves are arranged in a circumferential direction of the tire with alternately arranged first pitches and second pitches, wherein the second pitches are larger than the first pitches. Each inner middle lug groove extends from the crown main groove to its axially outer end terminating within the middle portion while decreasing its groove width toward the axially outer end. The inner middle lug grooves are arranged in a circumferential direction of the tire with substantially the same pitches.

In the first aspect of the present invention, the pitches of the inner middle lug grooves may be larger than the first pitches, but may be smaller than the second pitches.

In the first aspect of the present invention, the outer middle lug grooves may comprise a first outer middle lug groove having a first angle with respect an axial direction of the tire, and a second outer middle lug groove having a second angle larger than the first angle with respect to the axial direction of the tire, and wherein the first outer middle lug groove and the second outer middle lug groove are alternately arranged in the circumferential direction of the tire.

In the first aspect of the present invention, the inner middle lug grooves may comprise a first inner middle lug groove having a first angle with respect an axial direction of the tire, and a second inner middle lug groove having a second angle larger than the first angle with respect to the axial direction of the tire, and wherein the first inner middle lug groove and the second inner middle lug groove are alternately arranged in the circumferential direction of the tire.

In the first aspect of the present invention, each of the inner middle lug grooves and outer middle lug grooves may include straightly extending first groove edge having a first inclination angle of from 20 to 35 degrees with respect to an axial direction of the tire, and a straightly extending second groove edge having a second inclination angle of from 25 to 40 degrees with respect to the axial direction of the tire, which is larger than the first inclination angle.

In the first aspect of the present invention, each middle portion may be provided with a plurality of circumferentially extending longitudinal sub grooves that communicate between the adjacent outer middle lug groove and inner middle lug groove.

In the first aspect of the present invention, the longitudinal sub grooves may include an axially innermost longitudinal sub groove and an axially outermost longitudinal sub groove.

In the first aspect of the present invention, the tread portion may be further provided with a plurality of shoulder lateral grooves extending axially outwardly of the tire from each shoulder main groove so that an axially inner end of each shoulder lateral groove does not face each outer middle groove through the shoulder main groove.

In the first aspect of the present invention, two crown main grooves may be disposed on the tread portion to form a center portion therebetween, and wherein the crown portion is provided with a plurality of crown lug grooves that extend axially inwardly of the tire from each crown main groove so that an axially outer end of each crown lug groove does not face each inner middle lug groove through the crown main groove.

In the first aspect of the present invention, the tread portion may have a sea-ratio in a range of from 28% to 35%.

DESCRIPTION OF THE EMBODIMENTS

An embodiment of the present invention will be explained below with reference to the accompanying drawings.

Figure 1:
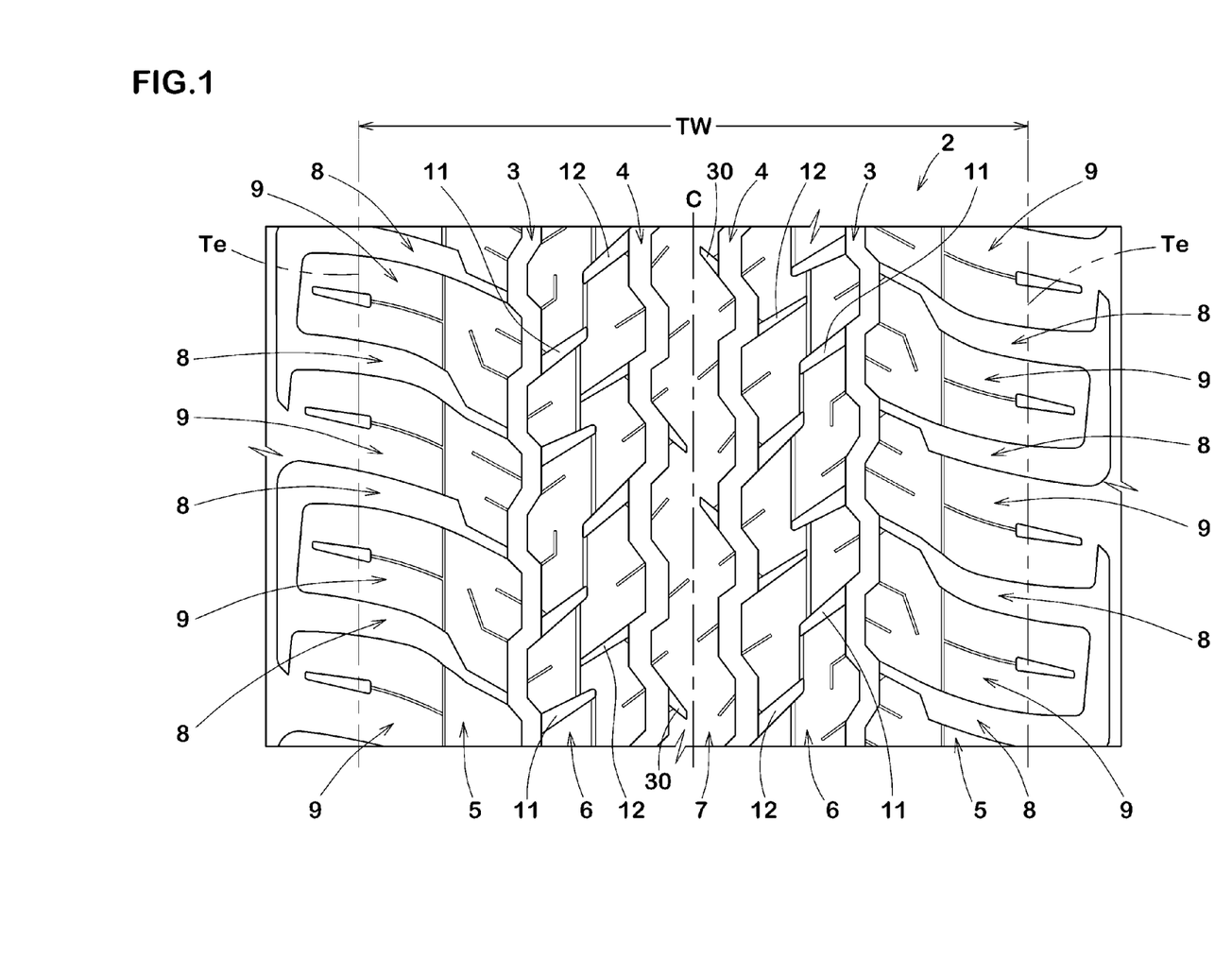
FIG. 1 is a development view of a tread portion of a pneumatic tire according to an embodiment of the present invention.

FIG. 1 illustrates a development view of a tread portion 2 of a pneumatic tire 1 in accordance with the present embodiment that may be suitably embodied as a mud and snow tire (M+S) designed to improved performance on both dry roads and mud terrain.

In the preferred embodiment, the tread portion 2 comprises a sea ratio of from 28% to 35%. The sea ratio of the tread portion 2 is defined as a ratio of total groove area to the gross tread area that includes grooves.

The tread portion 2 comprises a pair of tread edges Te and Te, and a tread width TW.

Here, tread edges Te are the axial outermost edges of the ground contacting patch of the tread portion 2 which occurs under a normally inflated loaded condition when the camber angle of the tire is zero. The normally inflated loaded condition is such that the tire is mounted on a standard wheel rim and inflated to a standard pressure and loaded with a standard tire load.

The tread width TW of the tread portion 2 is defined as the width measured under a normally inflated unloaded condition, as the axial distance between the tread edges Te, Te determined as above.

The normally inflated unloaded condition is such that the tire is mounted on the standard wheel rim and is inflated to the standard pressure but loaded with no tire load. In this application including specification and claims, various dimensions, positions and the like of the tire refer to those under the normally inflated unloaded condition of the tire unless otherwise noted.

The standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list.

The standard pressure is the "maximum air pressure" in JATMA, the "Inflation Pressure" in ETRTO, and the maximum pressure given in the "Tire Load Limits at Various Cold Inflation Pressures" table in TRA or the like.

The standard tire load is the "maximum load capacity" in JATMA, the "Load Capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

The tread portion 2 is provided with a pair of circumferentially and continuously extending shoulder main grooves 3, 3 adjacent to each tread edge Te, and at least one, preferably a pair of circumferentially and continuously extending crown main grooves 4, 4 disposed axially inwardly of the shoulder main grooves 3, 3. In another aspect of the present invention, one crown main groove 4 may be disposed on a tire equator C.

Thus, the tread portion 2 is separated into a plurality of land portions that include a pair of shoulder portions 5 each of which is between adjacent shoulder main groove 3 and the tread edge Te, a pair of middle portions 6 each of which is between adjacent shoulder main groove 3 and crown main groove 4, and a center portion 7 between crown main grooves 4, 4.

The shoulder main groove 3 and crown main groove 4 preferably have the respective groove widths in a range of not less than 7.0 mm, and more preferably in a range of from 9.0 to 12.0 mm, in order to improve mud terrain performance of the tire.

The shoulder main groove 3 and crown main groove 4 extend in a zigzag manner in the circumferential direction of the tire. The zigzag manner in accordance with the present embodiment includes a trapezoid wave manner as shown in FIG. 1.

Figure 2:
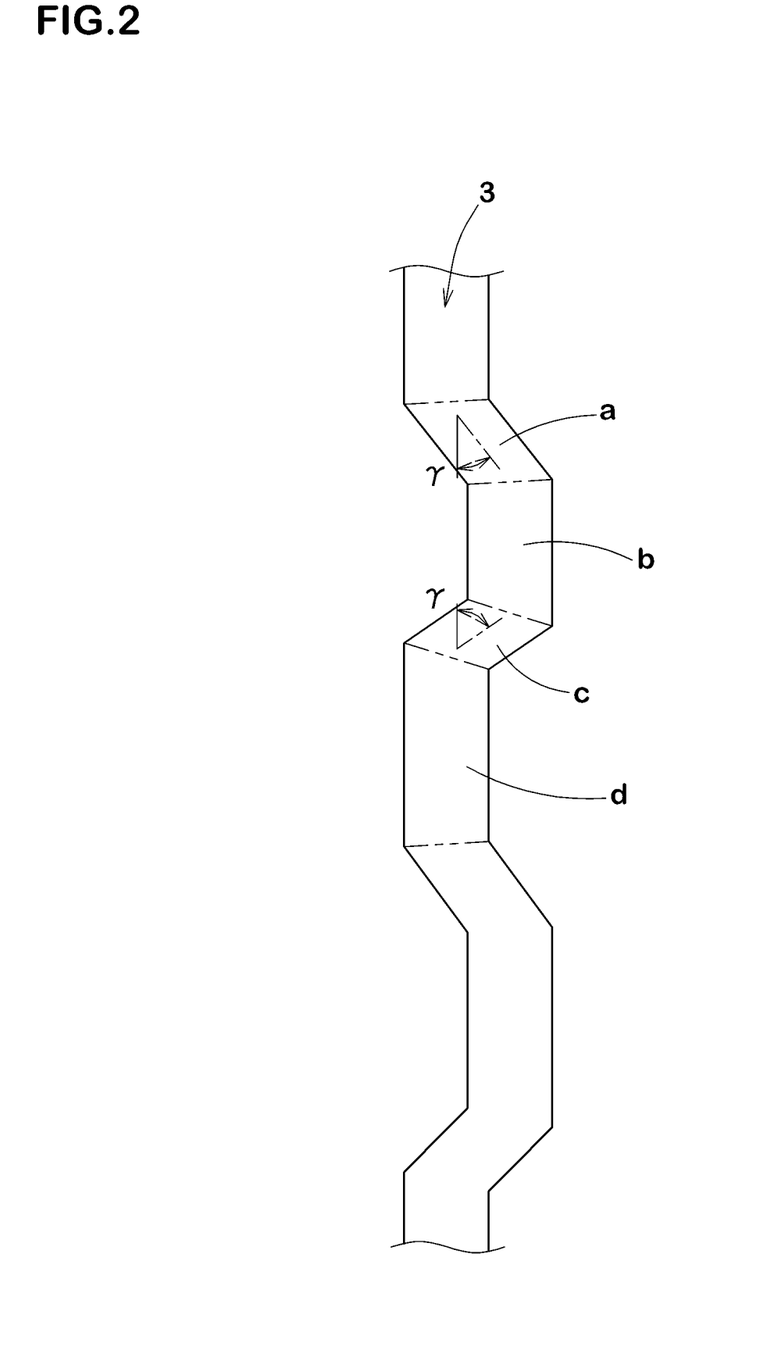
FIG. 2 is a partial enlarged view of a shoulder main groove of FIG. 1.

FIG. 2 illustrates a partial enlarged view of the shoulder main groove 3 in the right side of FIG. 1, as the representative example of the zigzag groove. The shoulder main groove 3 includes a plurality of repeated trapezoidal wave elements. Each trapezoidal wave elements comprises a first inclined part "a" with a first direction with respect to the circumferential direction of the tire, a circumferentially extending axially outer part "b" having one end connected to the first slanted part "a", a second inclined part "c" with a second direction opposite to the first direction with respect to the circumferential direction of the tire and connected to the axially outer part "b", and a circumferentially extending axially inner part "d" having one end connected to the second slanted part "a". In this embodiment, the crown main grooves 3 are also configured to substantially the same trapezoid wave manner with the shoulder main groove 3.

Since the first inclined parts "a" and the second inclined parts "c" include lateral components, the first and second inclined parts "a" and "c" may firmly compress loose mud therein, and shear it off for generating large traction force on mud terrain. In the preferred embodiment, the first inclined parts "a" and the second inclined parts "c" have angles $\gamma$ in a range of from 30 to 60 degrees with respect to the circumferential direction of the tire.

Referring back to FIG. 1, the shoulder portion 5 is provided with a plurality of shoulder lateral grooves 8 that extend beyond the tread edge Te from the shoulder main groove 3 to form a shoulder block row including a plurality of shoulder blocks 9.

Each shoulder lateral groove 8 preferably has a groove width in a range of not less than 2 mm. In the preferred embodiment, the groove width of the shoulder lateral groove 8 may gradually be increased axially outwardly for improving self-cleaning feature that mud clogged therein is smoothly released from the tread edge Te. In a still further preferred embodiment, the shoulder lateral groove has the groove width at the tread edge being at least double the groove width at its axially inner end.

The middle portion 6 is provided with a plurality of axially outer middle lug groove 11, and a plurality of axially inner middle lug groove 12.

Figure 3:
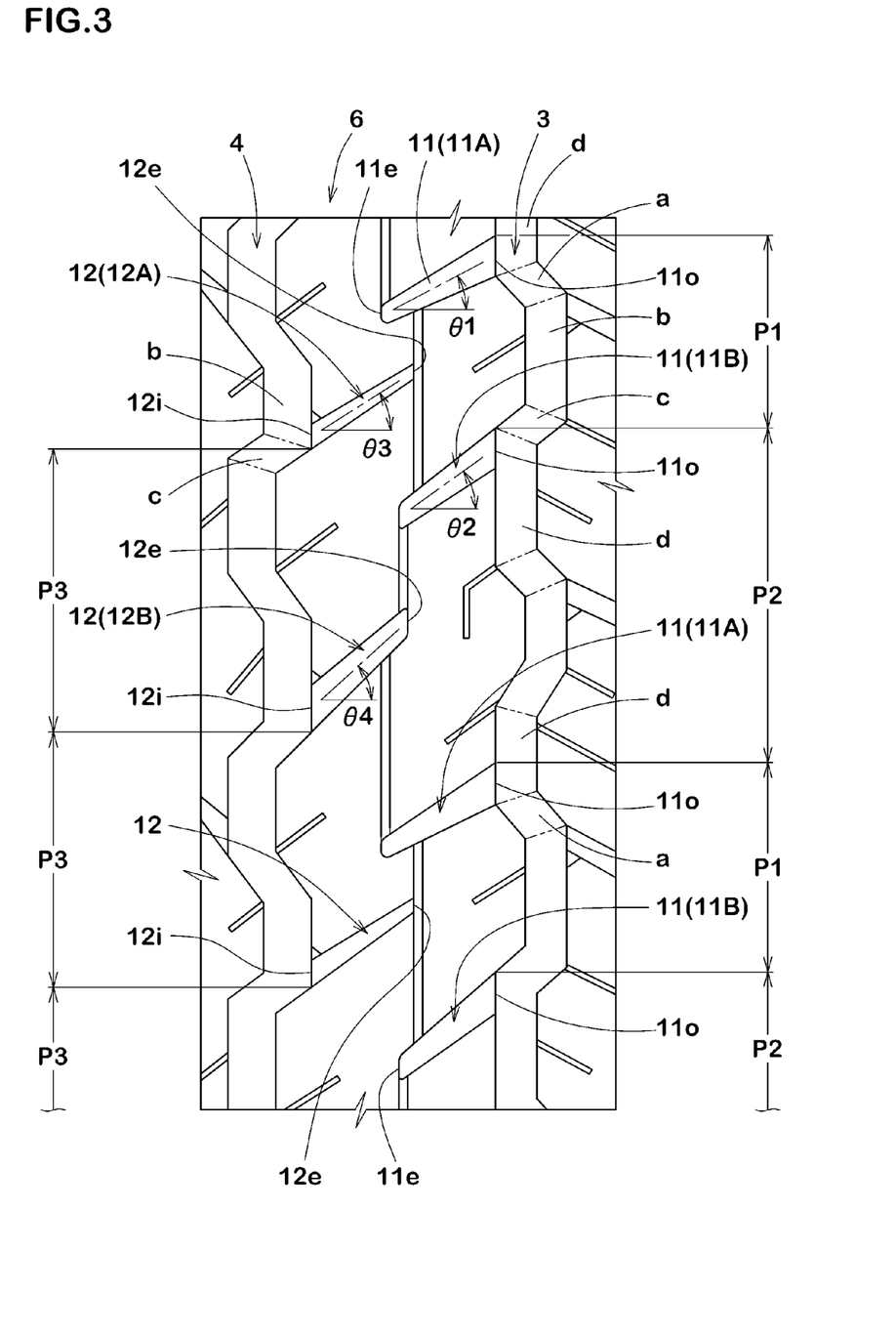
FIG. 3 is a partial enlarged view of a middle portion of FIG. 1.

FIG. 3 illustrates a partial enlarged view of the middle portion 6 in the right side of FIG. 1. Each axially outer middle lug groove 11 extends from the shoulder main groove 3 axially inwardly of the tire to its axially inner end 11e terminating within the middle portion 6. Each axially inner middle lug groove 12 extends from the crown main groove 4 axially outwardly of the tire to its axially outer end 12e terminating within the middle portion 6.

Preferably, each of the axially outer middle lug grooves 11 and the axially inner middle lug grooves 12 is decreasing in the groove width toward its end 11e, 12e respectively so as to form a tapered shape. Such axially inner and outer middle lug grooves 11 and 12 may easily release mud clogged therein into the crown main groove 4 or shoulder main groove 3 utilizing its tapered groove shape. Thus, each of the axially outer middle lug grooves 11 and the axially inner middle lug groove 12 may repeat a cycle that offers compressing mud therein, shearing it off for generating traction force, and, then releasing mud from its opened end which is connected to either crown main groove 4 or shoulder main groove 3, during traveling on mud terrain. Throughout the cycle described above, the tire in accordance with the present embodiment may continuously generate improved large traction force on loose mud terrain.

Figure 4:
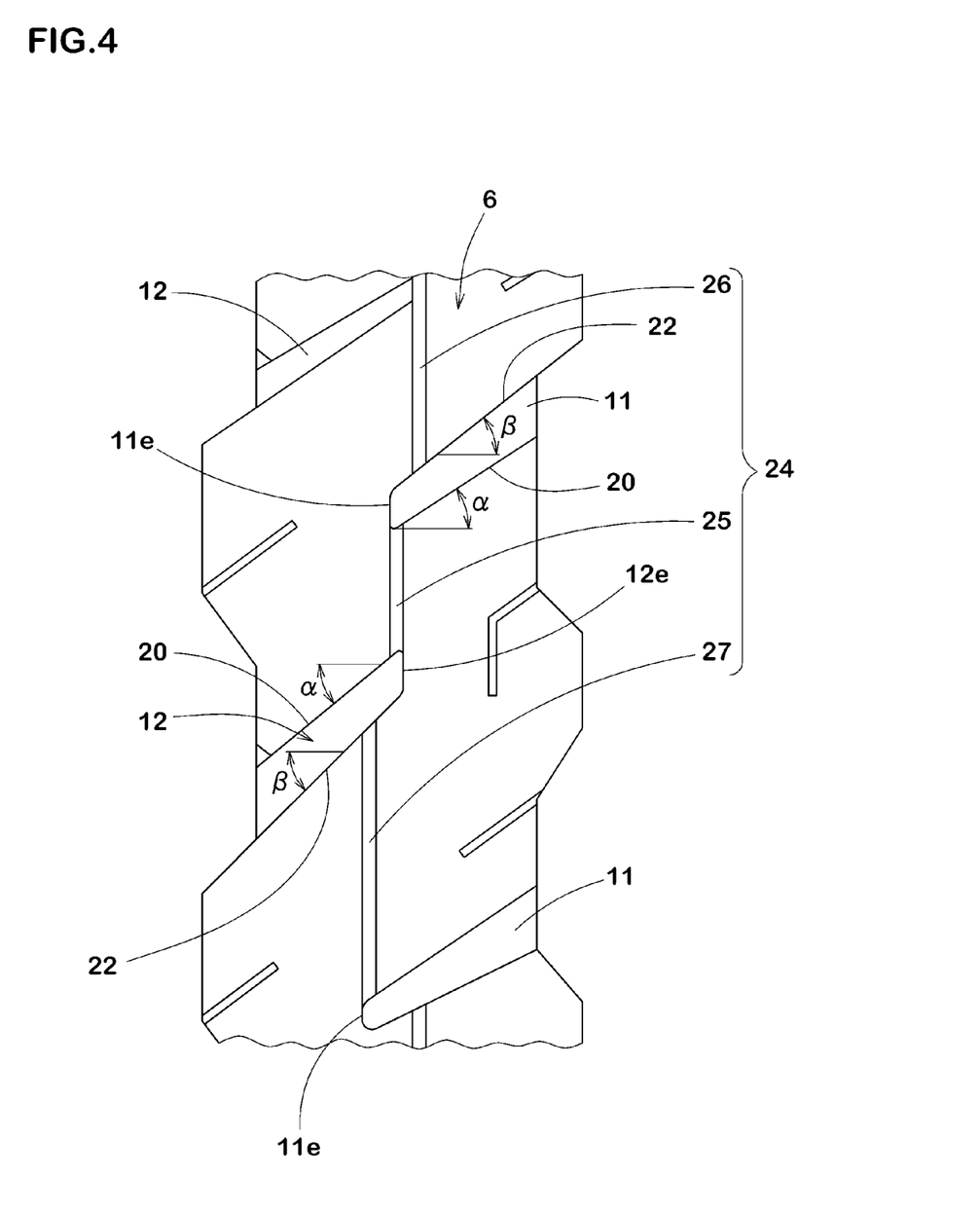
FIG. 4 is a partial enlarged view of the middle portion of FIG. 3.

FIG. 4 is a further partial enlarged view of the middle portion of FIG. 3. Each of the outer middle lug grooves 11 and the inner middle lug grooves 12 includes a straightly extending first groove edge 20 having a first inclination angle $\alpha$ of from 20 to 35 degrees with respect to an axial direction of the tire, and a straightly extending second groove edge 22 having a second inclination angle β of from 25 to 40 degrees with respect to the axial direction of the tire, which is larger than the first inclination angle α. Thus, each of the axially outer middle lug grooves 11 and the axially inner middle lug grooves 12 is decreasing in the groove width toward its end 11e, 12e respectively.

Preferably, the outer middle lug groove 11 extends axially inwardly of the tire beyond the axially outer end 12e of the inner middle lug groove 12. Thus, mud in wide range may effectively be released away from under the middle portion 6 during traveling.

Referring back to FIG. 3, the outer middle lug groove 11 and inner middle lug groove 12 are respectively arranged in the circumferential direction of the tire with intervals. Typically, the intervals are defined as "pitches" or "circumferential pitches", for determining each circumferential length between two adjacent lug grooves.

The outer middle grooves 11 are arranged in the circumferential direction of the tire with pitches alternately including a first pitch P1 and a second pitch P2 larger than the first pitch P1. While, the inner middle grooves 12 are arranged in the circumferential direction of the tire with substantially the same third pitches P3.

Due to pitches P1, P2 and P3, the middle portion 6 in accordance with the present embodiment differs in rigidity on its axially both sides. Furthermore, the middle portion 6 has irregularly circumferential rigidity on its axially outer side due to pitches P1 and P2. Thus, the middle portion 6 tends to deform complicatedly such as twist or in-plane bending when it is subjected to shearing force from the road. Such deformation of the middle portion 6 may pressure into mud clogged in each lug grooves for releasing it away therefrom. Furthermore, since the outer middle lug grooves 11 are arranged using two kinds of pitches, the better self-cleaning feature on the outer middle lug grooves 11 is provided.

As described above, the tire in accordance with the present embodiment may offer improved mud terrain performance due to its self-cleaning feature on outer and inner middle lug grooves 11 and 12. Since this advantage does not depend on groove volume of each middle lug groove, noise performance on dry asphalt roads may be maintained.

The third pitches P3 of the inner middle lug grooves 12 are the same or substantially the same. Here, the "substantially the same" mentioned above means that the third pitches P3 are not entirely the same but are different in slightly varying length that is within a range of a variable pitch arrangement. The variable pitch arrangement is a typically technique in tire manufacturing fields that includes circumferentially arranged lug grooves that are slightly varying pitches for dispersing noise generated therefrom. Typically, the variable pitch arrangement includes three to five kinds of pitches, for example.

In this embodiment, each inner middle lug groove 12 has an axially inner end 12i connected to the same position with respect to each trapezoidal wave element of the crown main groove 4. For example, axially inner end 12i of the inner middle lug groove 12 is connected to an end of the axially outer part "b" on the side of the second inclined part "c". Preferably, the inner middle lug groove 12 is inclined at the same direction with the second inclined part "c" so that each groove edge is continuously arranged in straight. Since the second inclined part "c" may perform as a part of inner middle lug groove 12, large traction force on loose mud terrain may further be obtained. Note that the pitches P1 of the inner middle lug grooves 12 are determined according to each trapezoidal wave element pitch in this embodiment.

The first and second pitches P1 and P2 of the outer middle lug groove 11 are determined in different way from the inner middle lug grooves 12. The outer middle lug grooves 11 have axially outer ends 11o that are connected to the different positions with respect to each trapezoidal wave element of the shoulder main groove 3.

In this embodiment, each axially outer end 11o of the outer middle lug grooves 11 are connected to the axially inner part "d" of each trapezoidal wave element of the shoulder main groove 3. However, the outer middle lug grooves 11 comprise a first outer middle lug groove 11A having the axially outer end 11o being connected to an end of the axially inner part "d" on the side of the first inclined part "a", and a second outer middle lug groove 11B having the axially outer end 11o being connected to an end of the axially inner part "d" on the side of the second inclined part "c". In this embodiment, the first outer middle lug groove 11A and the second outer middle lug groove 11B are alternately arranged in the circumferential direction of the tire. Preferably, each second outer middle lug groove 11B is inclined at the same direction with the second inclined part "c" so that each groove edge is continuously arranged in straight. Thus, since the second inclined part "c" may perform as a part of second outer middle lug groove 11B, large traction force on loose mud terrain may further be obtained. Thus, it is understood that the first and second pitches P1 and P2 of the outer middle lug grooves 11 are determined by varying positions to which the outer middle lug grooves are connected. Note that the first and second pitches P1 and P2 of the outer middle lug grooves 11 may be adopted the variable pitch arrangement, respectively.

In order to further improve mud terrain performance, the third pitches P3 of the inner middle lug grooves 12 preferably include at least one pitch that is larger than the first pitches P1, but is smaller than the second pitches P2.

In order to further improve mud terrain performance while preventing uneven wear on the middle portion 6, a ratio P2/P1 of two adjacent second pitch P2 and the first pitch P1 is preferably in a range of from not less than 1.3, more preferably not less than 1.5, but preferably not more than 2.0, more preferably not more than 1.8.

In order to improve self-cleaning feature on the outer middle lug grooves 11 while maintaining circumferential and lateral rigidity of the middle portion 6, the first outer middle lug grooves 11A and second outer middle lug grooves 11B are preferably inclined at angles θ1, θ2 in a range of from 20 to 40 degrees with respect to the axial direction of the tire, respectively. More preferably, the angles θ2 of the second outer middle lug grooves 11B are larger than the angles θ1 of the first outer middle lug grooves 11A. Thus, such different angles θ1 and θ2 of the outer middle lug grooves 11 may further improve self-cleaning feature on the outer middle lug grooves 11.

Similarly, in order to improve self-cleaning feature on the inner middle lug grooves 12 while maintaining circumferential and lateral rigidity of the middle portion 6, the inner middle lug grooves 12 include a first inner middle lug groove 12A having an angle θ3 with respect to the axial direction of the tire, and a second inner middle lug groove 12B having an angle θ4 larger than the angle θ3 with respect to the axial direction of the tire. The first inner middle lug groove 12A and the second inner middle lug groove 12B are alternately arranged in the circumferential direction of the tire. The first inner middle lug groove 12A and the second inner middle lug groove 12B are inclined in the same direction. The angles θ3, θ4 of the first inner middle lug groove 12A and the second inner middle lug groove 12B are preferably in a range of from 20 to 40 degrees with respect to the axial direction of the tire, respectively.

Referring back to FIG. 4, the middle portion 6 is further provided with a plurality of straightly extending longitudinal sub grooves 24 that connecting between the axially outer middle lug groove 11 and the axially inner middle lug groove 12. In this present embodiment, the longitudinal sub grooves 24 include an axially outer longitudinal sub groove 26, an axially inner longitudinal sub groove 27, and an axially middle longitudinal sub grooves 25 therebetween.

The axially middle longitudinal sub groove 26 communicates the axially inner end 11e of the outer middle lug groove 11 with the axially outer end 12e of the inner middle lug groove 12. The axially outer longitudinal sub groove 26 is disposed axially outwardly of the axially inner end 11e of the outer middle lug grooves 11. The axially inner longitudinal sub groove 27 is disposed axially inwardly than the axially middle longitudinal sub groove 26 to communicate the axially inner end 11e of the outer middle lug groove 11 with the position being away from the axially outer end 12e toward the crown main groove 4 of the inner middle lug groove 12. Furthermore, these axially inner longitudinal sub groove 27, axially outer longitudinal sub groove 26 and axially middle longitudinal sub groove 25 are circumferentially arranged in turn.

The longitudinal sub grooves 24 tend to deform so as to close its groove width when coming into contact with roads. Such deformation on longitudinal sub grooves 24 also causes deformation of outer and inner lug grooves 11 and 12 to which the longitudinal sub grooves 24 are connected. Furthermore, since the longitudinal sub grooves 24 include a plurality of sub grooves disposed in different position with respect to the axial direction of the tire, deformation thereof also occurs in different position with respect to the axial direction of the tire in turn. Therefore, mud temporary clogged in the middle lug grooves 11 and 12 may be easily released therefrom during traveling, whereby mud terrain performance is further improved.

In order to further improve the advantage above while maintaining pattern rigidity of the middle portion 6, the longitudinal sub groove 24 preferably have groove widths in a range of from 1.0 to 3.0 mm, more preferably in a range of from 1.0 to 2.0 mm. The groove depths of the longitudinal sub groove 24 are preferably in a range of from 30% to 90% in relation to the groove depth of the crown groove 4.

Referring back to FIG. 1, each outer middle lug groove 11 on the middle portion 6 is disposed so that its axially outer end does not face to an axially inner end of each shoulder lateral groove 8 through the shoulder main groove 3. Namely, the axially outer end 11e of the axially outer middle lug groove 11 and the axially inner end of the shoulder lateral groove 8 have no overlapped portion through the shoulder main groove 3 for dispersing self-cleaning feature that releases clogged mud from both shoulder lateral grooves 8 and axially outer middle lug grooves 11 along the circumferential direction of the tire, whereby mud terrain performance is further improved.

The crown portion 7 is provided with a plurality of crown lug grooves 30 that extends axially inwardly of the tire from both crown main grooves 4 and 4. Each crown lug groove 30 is preferably inclined in opposite direction in relation to the outer and middle lug grooves 11 and 12 at angle of from 20 to 40 degrees with respect to the axial direction of the tire.

Preferably, each crown lug groove 30 is provided so that its axially outer end does not face to an axially inner end of each inner middle lug groove 12 through the crown main groove 4. Thus, self-cleaning feature that releases clogged mud from both crown lug grooves 30 and axially inner middle lug grooves 12 is dispersed along the circumferential direction of the tire, whereby mud terrain performance is further improved while maintaining pattern rigidity of the tread portion 2.

The present invention is more specifically described and explained by means of the following Examples and References. It is to be understood that the present invention is not limited to these Examples and embodiments described above.

Comparison Test

In order to confirm the advantage of the present invention, pneumatic tires of 285/60R18 having with basic tread patterns of FIG. 1 with the tread width of 224 mm except for details shown in Table 1 were made and tested with respect to noise performance, mud terrain performance and steering stability as follows. The reference tire (Ref.1) was also tested. Each tested tire had the same groove widths and depths with respect to shoulder main grooves, crown main grooves and shoulder lateral grooves. Regarding example tires, the cycle in the trapezoid wave elements of the shoulder and crown main grooves were changed according to the varying pitches of lug grooves.

Noise Performance Test:

According to the protocol specified in JISO-C606, a four-wheel drive car with a displacement of 4,700 cc having test tires as its four wheels was coasted at a speed of 50 km/hr in a straight test course, and then the noise sound level was measured with a microphone set at 7.5 meter sideways from the test car. The results in Table 1 are indicated as the reciprocal number of measured value using an index based on Ref.1 being 100. The larger the value, the better the performance is.

Mud Terrain Performance Test:

A time attack test was performed using the four-wheel drive car above on a loose mud test course having a 20 cm mud thickness. The results are indicated in Table 1 as the reciprocal number of the lap time based on Ref.1 being 100. The larger the value, the better the performance is.

Steering Stability Test:

Steering stability of the four-wheel drive car above at cornering on asphalt roads was evaluated by the driver's feeling. The results are indicated in Table using a score based on Ref.1 being 100. The larger the score, the better the performance is.

TABLE 1

|  | Ref. 1 | Ex. 1 | Ex. 2 | Ex. 3 | Ex. 4 | Ex. 5 |
| --- | --- | --- | --- | --- | --- | --- |
| Second pitch P2/first pitch P1 | 1 | 1.3 | 1.5 | 1.7 | 1.8 | 2 |
| Third pitch P3/first pitch P1 | 1 | 1.4 | 1.4 | 1.4 | 1.4 | 1.4 |
| Mud terrain performance (Index) | 100 | 102 | 102 | 103 | 102 | 102 |
| Noise performance (Index) | 100 | 101 | 101 | 102 | 102 | 102 |
| Steering stability (Score) | 100 | 99 | 99 | 99 | 98 | 97 |

From the test results, it was confirmed that Example tires in accordance with the present embodiment of the invention can be effectively improved mud terrain performance while maintaining noise performance.

What is claimed is:

1. A pneumatic tire comprising
a tread portion having a pair of tread edges, the tread portion being provided with a pair of circumferentially and continuously extending zigzag shoulder main grooves adjacent to each tread edge and a pair of circumferentially and continuously extending zigzag crown main grooves disposed between the shoulder main grooves to define a pair of middle portions each of which is between the adjacent shoulder main groove and crown main groove,
the respective middle portions being provided with a plurality of inner middle lug grooves and a plurality of outer middle lug grooves,
each outer middle lug groove extending from the shoulder main groove to its axially inner end terminating within the middle portion while decreasing its groove width toward the axially inner end, each outer middle lug groove being inclined in a same direction with respect to an axial direction of the tire, the outer middle lug grooves arranged in the circumferential direction of the tire with alternately arranged first pitches and second pitches, wherein the second pitches are larger than the first pitches, and
each inner middle lug groove extending from the crown main groove to its axially outer end terminating within the middle portion while decreasing its groove width toward the axially outer end, the inner middle lug grooves arranged in the circumferential direction of the tire with substantially the same pitches, each inner middle lug groove including a pair of groove edges which are inclined in a same direction with respect to the axial direction of the tire,
wherein the inner middle lug grooves comprise a first inner middle lug groove having a first angle with respect to the axial direction of the tire and a second inner middle lug groove having a second angle larger than the first angle with respect to the axial direction of the tire, and
wherein the first inner middle lug groove and the second inner middle lug groove are alternately arranged in the circumferential direction of the tire.

2. The tire according to claim 1, wherein the pitches of the inner middle lug grooves are larger than the first pitches, but are smaller than the second pitches.

3. The tire according to claim 1,
wherein the outer middle lug grooves comprise a first outer middle lug groove having a first angle with respect to the axial direction of the tire, and a second outer middle lug groove having a second angle larger than the first angle with respect to the axial direction of the tire, and
wherein the first outer middle lug groove and the second outer middle lug groove are alternately arranged in the circumferential direction of the tire.

4. The tire according to claim 1,
wherein each of the inner middle lug grooves and outer middle lug grooves includes a straightly extending first groove edge having a first inclination angle of from 20 to 35 degrees with respect to the axial direction of the tire and a straightly extending second groove edge having a second inclination angle of from 25 to 40 degrees with respect to the axial direction of the tire, wherein the second inclination angle is larger than the first inclination angle.

5. The tire according to claim 1,
wherein each middle portion is provided with a plurality of circumferentially extending longitudinal sub grooves that communicate between adjacent outer middle lug groove and inner middle lug groove.

6. The tire according to claim 5,
wherein the longitudinal sub grooves include an axially innermost longitudinal sub groove and an axially outermost longitudinal sub groove.

7. The tire according to claim 1,
wherein the tread portion is further provided with a plurality of shoulder lateral grooves extending axially outwardly of the tire from each shoulder main groove so that an axially inner end of each shoulder lateral groove does not face each outer middle groove through the shoulder main groove.

8. The tire according to claim 1,
wherein the tread portion has a sea-ratio in a range of from 28% to 35%.

9. The tire according to claim 1,
wherein each middle portion is provided with an axially outer middle longitudinal sub groove that extends along the circumferential direction of the tire in a single straight manner and that communicates between adjacent outer middle lug grooves at a location that is away axially outwardly from axially inner ends of the adjacent outer middle lug grooves.

10. The tire according to claim 1,
wherein the first inner middle lug groove is narrower than the second inner middle lug groove.

11. The tire according to claim 3,
wherein the first outer middle lug groove is longer than the second outer middle lug groove.

12. A pneumatic tire comprising:
a tread portion having a pair of tread edges, the tread portion being provided with a pair of circumferentially and continuously extending zigzag shoulder main grooves adjacent to each tread edge and a pair of circumferentially and continuously extending zigzag crown main grooves disposed between the shoulder main grooves to define a pair of middle portions each of which is between the adjacent shoulder main groove and crown main groove,
the respective middle portions being provided with a plurality of inner middle lug grooves and a plurality of outer middle lug grooves,
each outer middle lug groove extending from the shoulder main groove to its axially inner end terminating within the middle portion while decreasing its groove width toward the axially inner end, each outer middle lug groove being inclined in a same direction with respect to an axial direction of the tire, the outer middle lug grooves arranged in the circumferential direction of the tire with alternately arranged first pitches and second pitches which are defined between directly adjacent outer middle lug grooves,
each inner middle lug groove extending from the crown main groove to its axially outer end terminating within the middle portion while decreasing its groove width toward the axially outer end, the inner middle lug grooves arranged in the circumferential direction of the tire with substantially the same pitches, and
the pitches of the inner middle lug grooves being larger than the first pitches, but are smaller than the second pitches.

13. The tire according to claim 12,
wherein each of the inner middle lug grooves includes a pair of groove edges which are inclined in a same direction with respect to the axial direction of the tire.

14. The tire according to claim 12,
wherein each middle portion is provided with an axially outer middle longitudinal sub groove that extends along the circumferential direction of the tire in a single straight manner and that communicates between adjacent outer middle lug grooves at a location that is away axially outwardly from axially inner ends of the adjacent outer middle lug grooves.

15. The tire according to claim 12,
wherein the first inner middle lug groove is narrower than the second inner middle lug groove.

16. The tire according to claim 12,
wherein the outer middle lug grooves comprise a first outer middle lug groove having a first angle with respect to an axial direction of the tire and a second outer middle lug groove having a second angle larger than the first angle with respect to the axial direction of the tire, and
wherein the first outer middle lug groove and the second outer middle lug groove are alternately arranged in the circumferential direction of the tire, and
wherein the first outer middle lug groove is longer than the second outer middle lug groove.

* * * * *